United States Patent [19]
Matsumoto et al.

[11] Patent Number: 5,983,166
[45] Date of Patent: Nov. 9, 1999

[54] STRUCTURE MEASUREMENT SYSTEM

[75] Inventors: Makoto Matsumoto; Takayuki Kataoka, both of Osaka, Japan

[73] Assignee: Komatsu Ltd., Tokyo, Japan

[21] Appl. No.: 08/945,322

[22] PCT Filed: Sep. 24, 1996

[86] PCT No.: PCT/JP96/02755

§ 371 Date: Oct. 22, 1997

§ 102(e) Date: Oct. 22, 1997

[87] PCT Pub. No.: WO97/12202

PCT Pub. Date: Apr. 3, 1997

[30] Foreign Application Priority Data

Sep. 28, 1995 [JP] Japan ................................. 7-250959

[51] Int. Cl.$^6$ ............................. G01B 11/24; G01C 15/00
[52] U.S. Cl. .................... 702/152; 702/150; 364/528.37; 33/300
[58] Field of Search ..................... 702/152, 153, 702/150, 155, 159; 33/504, 503, 300, 281; 395/86; 356/138; 364/528.37

[56] References Cited

U.S. PATENT DOCUMENTS

| | | | |
|---|---|---|---|
| 4,815,006 | 3/1989 | Andersson et al. | 702/104 |
| 4,880,992 | 11/1989 | Niedermayr et al. | 250/559.3 |
| 5,229,828 | 7/1993 | Wiklund | 356/4.01 |
| 5,361,217 | 11/1994 | Makimura et al. | 702/152 |
| 5,617,335 | 4/1997 | Hashima et al. | 340/815.57 |

FOREIGN PATENT DOCUMENTS

| | | |
|---|---|---|
| 64-6719 | 1/1989 | Japan . |
| 3-085403 | 4/1991 | Japan . |
| 3-170812 | 7/1991 | Japan . |
| 6-162147 | 6/1994 | Japan . |
| 7-27527 | 1/1995 | Japan . |
| 8-136218 | 5/1996 | Japan . |
| 8-150582 | 6/1996 | Japan . |

*Primary Examiner*—Marc S. Hoff
*Assistant Examiner*—Hien Vo
*Attorney, Agent, or Firm*—Armstrong, Westerman, Hattori, McLeland & Naughton

[57] ABSTRACT

An inexpensive structure measurement system without use of large-sized fixed equipment and large installation space, which is capable of reducing a burden imposed on the workman by minimizing a work of affixing target marks etc. The system comprises a robot 5 that has an arm 11 for carrying a three-dimensional visual sensor 12 for measuring a measuring object 1 and that is movable in desired directions; a distance meter 6 for measuring the position of the arm 11 and the installation position of the measuring object 1; and control operation terminals 7, 8, 9 for prestoring design data (CAD data) associated with the configuration of the measuring object 1 and calculating the position of a measuring point measured by the three-dimensional visual sensor 12, based on the design data and positional data obtained by the distance meter 6.

5 Claims, 15 Drawing Sheets

STRUCTURE MEASUREMENT SYSTEM

TECHNICAL FIELD

The present invention relates to a structure measurement system and more particularly to a structure measurement system for measuring the configuration etc. of a large-sized structure such as a girder for beam bridges.

BACKGROUND ART

In one known method for measuring the configuration, dimension etc. of, for example, a large-sized structure such as a bridge girder, target marks, reflection seals or the like are affixed to all measuring points in the measuring object and these target marks are sighted for measurement by the workman through an angle measuring instrument such as a transit or through an optical distance measuring instrument.

Another known measurement method is carried out with the arrangement illustrated in FIG. 15 in which a movable portal structure 102 is so disposed as to straddle across a measuring object 100 and to travel along guide rails 101 which extend in parallel with the measuring object 100. A hand 103 having a measuring instrument 104 at its leading end is mounted on the portal structure 102 and the portal structure 102 travels along the guide rails 101, while measuring the measuring object 100 by means of the measuring instrument 104.

Japanese Patent Publication No. 60-196615(1985) discloses still another known method in which an image pick-up device (i.e., angle measuring instrument) travels along guide rails extending in parallel with a measuring object and measurement is made utilizing triangulation.

The above method using target marks or the like has the disadvantages that affixing of target marks to all measuring points in a measuring object is troublesome and that visual inspection of these target marks causes lots of fatigue to the workman and is very time-consuming.

The method illustrated in FIG. 15 requires a large-sized fixed equipment and therefore large installation space. Since this method has to meet the conflicting requirements, that is, the installation of large-sized equipment and high accuracy, the measurement cost inevitably increases.

The method disclosed in the above Japanese Publication requires another set of guide rails laid on the rear side of the measuring object in order to install the image pick-up device. This also creates a need for large-sized fixed equipment, entailing an increase in the cost of the overall system.

The present invention has been made with a view to solving the foregoing problems and one of the objects of the invention is therefore to provide a structure measurement system which can be economically formed as it requires no large-sized fixed equipment nor large installation space and which can reduce the workman's burden by minimizing the work of affixing target marks or the like.

DISCLOSURE OF THE INVENTION

The above object can be achieved by a structure measurement system according to the invention, comprising:

(a) a robot that comprises an arm carrying a measuring instrument for measuring a structure as a measuring object and that is movable in desired directions;

(b) a distance measuring unit for measuring the position of the arm and the installation position of the structure;

(c) a measuring point calculating operation unit for prestoring design data associated with the configuration of the structure and calculating the position of a measuring point in the structure measured by the measuring instrument, based on the design data and positional data obtained by the distance measuring unit. According to the invention, when measuring a structure (measuring object), the distance measuring unit, firstly, measures the installation position of the structure by measuring reference points in the structure and measures the home position of the arm (i.e., measuring instrument) of the robot and the position of the arm after movement from the home position. Based on the results of the measurements, the measuring point calculating operation unit calculates a parameter for transformation between a coordinate system associated with the measuring instrument and a coordinate system associated with the distance measuring unit. Then, according to the positional data on the arm and on the structure thus obtained as well as prestored design data on the configuration of the structure, the position and orientation of a measuring point in the structure, which are represented by the coordinate system of the distance measuring unit, are calculated. After all measuring points in a specified measurement block within the moving range of the arm has been calculated in this way, measurement is executed. After completion of the measurement, the robot is allowed to move to carry out calculation and measurement of measuring points in another measurement block in the similar manner. Thus, continuous measurement is executed.

In the structure measurement system of the invention, the arm supported by the robot and carrying the measuring instrument is designed to be movable to desired positions so that large-sized fixed equipment and large installation space are no longer required, resulting in low system cost. Additionally, there is no need to affix target marks to all measuring points and therefore the burden imposed on the workman can be reduced. Another advantage is the automatic arithmetic operation performed by the measuring point calculating operation unit in which the position and orientation of a measuring point are automatically calculated utilizing prestored design data associated with the configuration of the structure. This enables it to automatically measure a measuring point while avoiding interference with the structure and, as a result, labor saving can be achieved.

Preferably, the measuring instrument of the invention is a three-dimensional visual sensor of a non-contacting type for measuring the position and orientation of a measuring point in a measuring object, by picking up a three-dimensional image of the object and processing the image. Use of such a three-dimensional visual sensor makes it possible to obtain the three-dimensional coordinates of a measuring point including its depth and permits high-accuracy measurement even if the measuring instrument is not precisely directed in a direction perpendicular to the measuring object. In addition, this measuring instrument is of a non-contacting type and therefore is free from wear, providing long service life.

The robot preferably includes an azimuth instrument and an accelerometer as well as a robot position calculating operation unit which calculates the position of the robot based on orientation data and speed data obtained from the azimuth instrument and accelerometer respectively. With this arrangement, an automatic navigation function can be provided for the robot, resulting in further labor saving.

The distance measuring unit may measure the installation position of the structure by measuring at least three target marks attached to the structure at specified positions.

Similarly, the distance measuring unit may measure the position of the arm by measuring a target mark attached to the arm at a specified position.

BEST MODE FOR CARRYING OUT THE INVENTION

Figure 1:
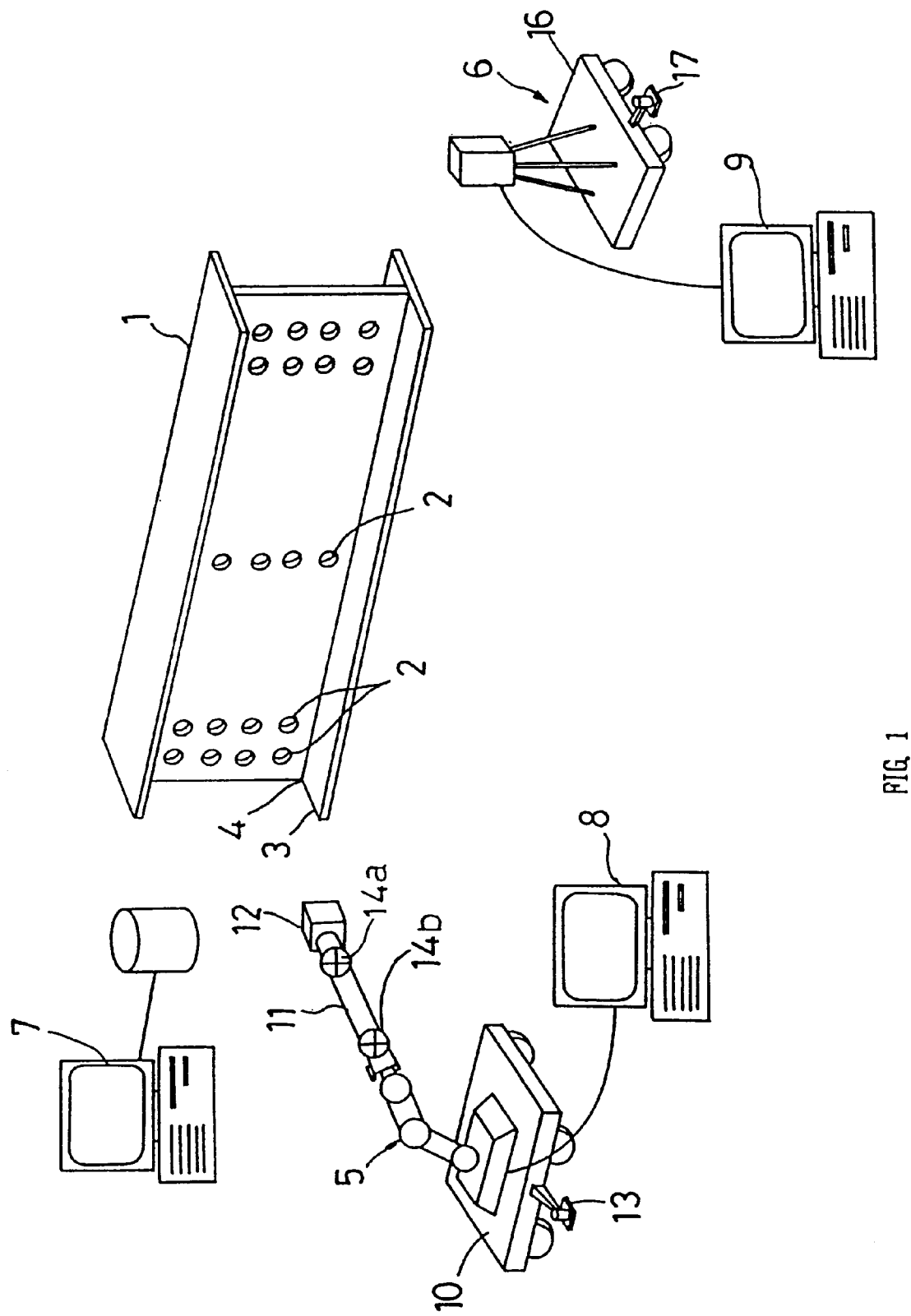
FIG. 1 is a schematic structural diagram of a structure measurement system according to one embodiment of the invention.

Referring now to the drawings, a structure measurement system according to a preferred embodiment of the invention will be described below.

FIG. 1 schematically illustrates a structure measurement system according to one embodiment of the invention. In this embodiment, the invention is applied to a system for measuring the positions of a number of bolt holes 2, a convex edge 3 and a concave edge 4, these bolt holes and edges being formed in a measuring object (hereinafter referred to as "object") consisting of an H-steel for use in a bride girder. The structure measurement system comprises a robot 5, a distance meter 6 and a terminal for data management 7. The robot 5 and the distance meter 6 include a terminal for object measurement 8 and a terminal for the distance meter 9, respectively. The data management terminal 7, object measurement terminal 8 and distance meter terminal 9 constitute a wireless LAN so that data transmission between the terminals 7, 8 and 9 can be carried out.

The robot 5 includes a mobile carriage 10; an articulated arm 11 having six degrees of freedom and mounted on the carriage 10; and a three-dimensional visual sensor 12 attached to the leading end of the arm 11 for serving as a measuring instrument. For a navigation function, the carriage 10 is equipped with an azimuth instrument (gyro) 20 (described later), a servo accelerometer 21, wheels 22 with two rotary encoders and others. The carriage 10 also includes a stabilizer 13 for anchoring the carriage 10 on the ground during measurement. The three-dimensional visual sensor 12 is a non-contacting type sensor that projects a laser slit light or code-patterned light to the object 1 and executes image processing thereby to measure the position of the center of each bolt 2 and the positions of the convex and concave edges 3, 4. Disposed within the arm 11 is a vibration sensor (not shown) for detecting the vibration of the three-dimensional visual sensor 12.

The distance meter 6 is an optical distance meter. The distance meter 6 picks up the images of target marks 14a, 14b (two target marks in this embodiment) affixed to the arm 11 of the robot 5 and the images of at least three target marks 15 (four target marks in this embodiment: See FIG. 7) affixed to the object 1 and then processes these images to obtain the distances from the distance meter 6 to the respective target marks 14a, 14b, 15. The distance meter 6 is allowed to move by a mobile carriage 16 and to be anchored on the ground at the time of measurement by means of a stabilizer 17 similar to the stabilizer 13 used for the robot 5.

The data management terminal 7 prestores design data (CAD/CAM drawing data: hereinafter referred to as "CAD data") associated with the object 1. The CAD data is transmitted to the object measurement terminal 8 where the CAD data is converted into data based on a distance meter coordinate system.

Next, the automatic navigation function of the carriage 10 will be explained with reference to FIGS. 2 and 3.

Figure 2:
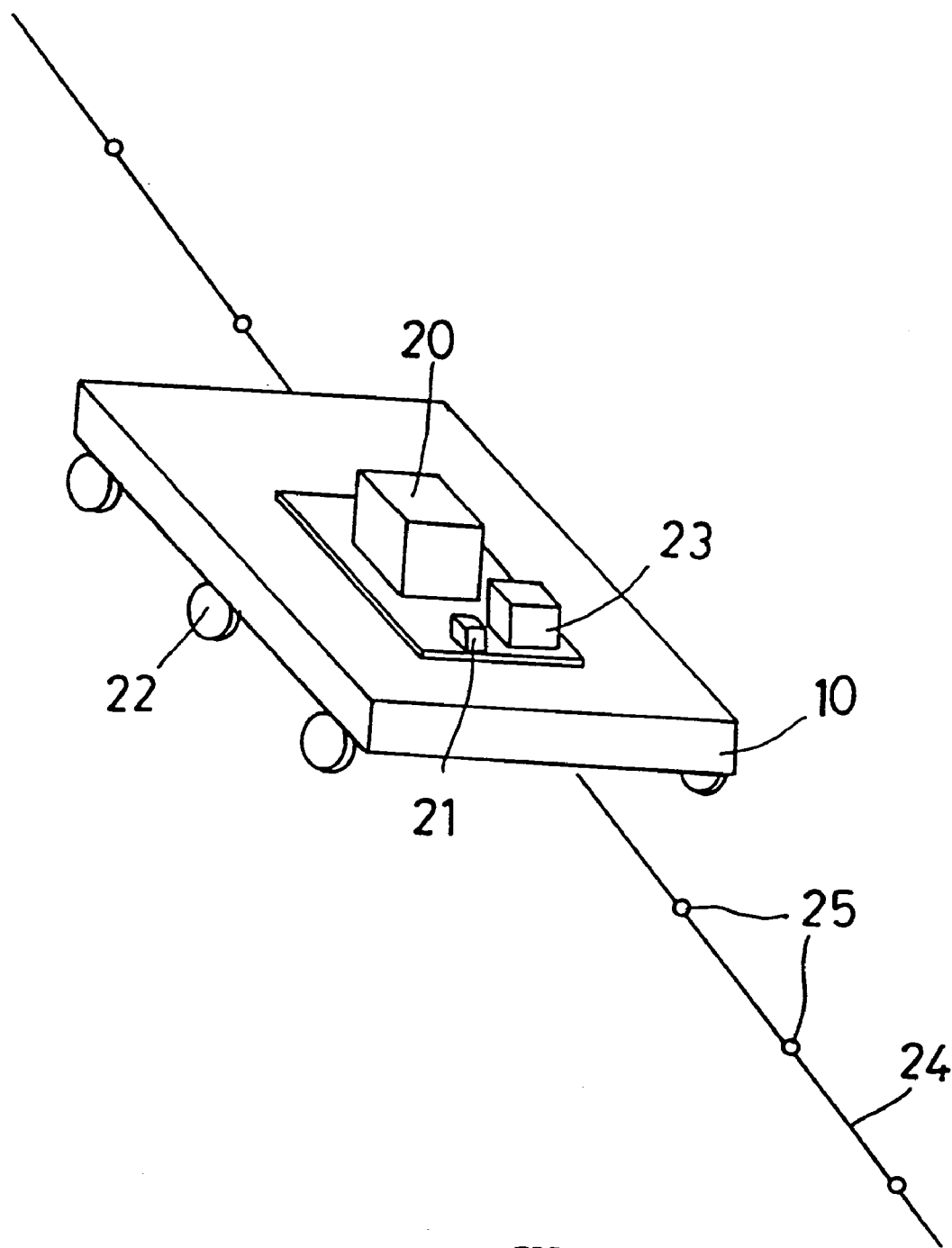
FIG. 2 is a diagram illustrating an automatic navigation mechanism for a carriage.

As seen from FIG. 2, the carriage 10 comprises the azimuth instrument (gyro) 20, the servo accelerometer 21, the wheels with two rotary encoders 22, a photoelectric sensor (not shown) for reading marks and a data processing unit 23. Laid along the traveling path of the carriage 10 is a guide line 24 such as a rope. Two marks 25 are spaced at predetermined intervals (50 cm in this embodiment) on the guide line 24. These marks 25 are read by the aforesaid mark-reading photoelectric sensor disposed on the carriage 10.

The azimuth instrument 20, servo accelerometer 21, rotary encoders and mark-reading photoelectric sensor respectively generate signals to be input in the data processing unit 23. According to these input signals, the data processing unit 23 repeatedly performs arithmetic operation for a specified very short period of time for obtaining the orientation and moving distance (orientation×distance) Of the carriage 10. In this way, the travel path of the carriage 10 from a predetermined home position is obtained through calculation.

Figure 3:
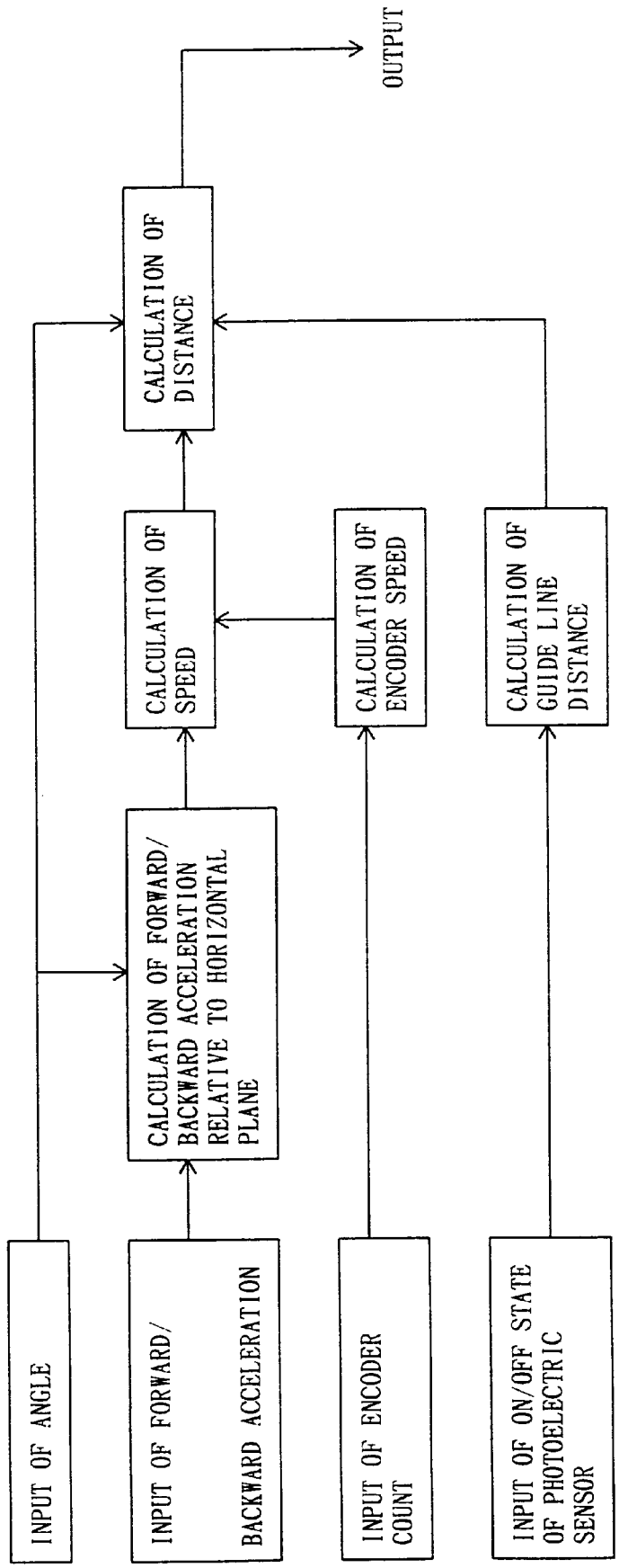
FIG. 3 is a block diagram of an arithmetic operation process incorporated in automatic navigation of the carriage.

The procedure of the arithmetic operation performed by the data processing unit 23 is shown in FIG. 3. As seen from FIG. 3, acceleration in forward or backward directions with respect to a horizontal plane is calculated from forward/backward acceleration data obtained from the servo accelerometer 21 and angular data obtained from the azimuth instrument 20. Speed is calculated from the acceleration. From the speed data thus obtained and the angular data obtained from the azimuth instrument, distance (orientation×distance) is calculated. At that time, the above speed data is corrected by speed obtained from the output signal of the encoders while the above distance data is corrected by distance obtained from the output signal of the photoelectric sensor which senses the marks on the guide line 24.

Figure 4:
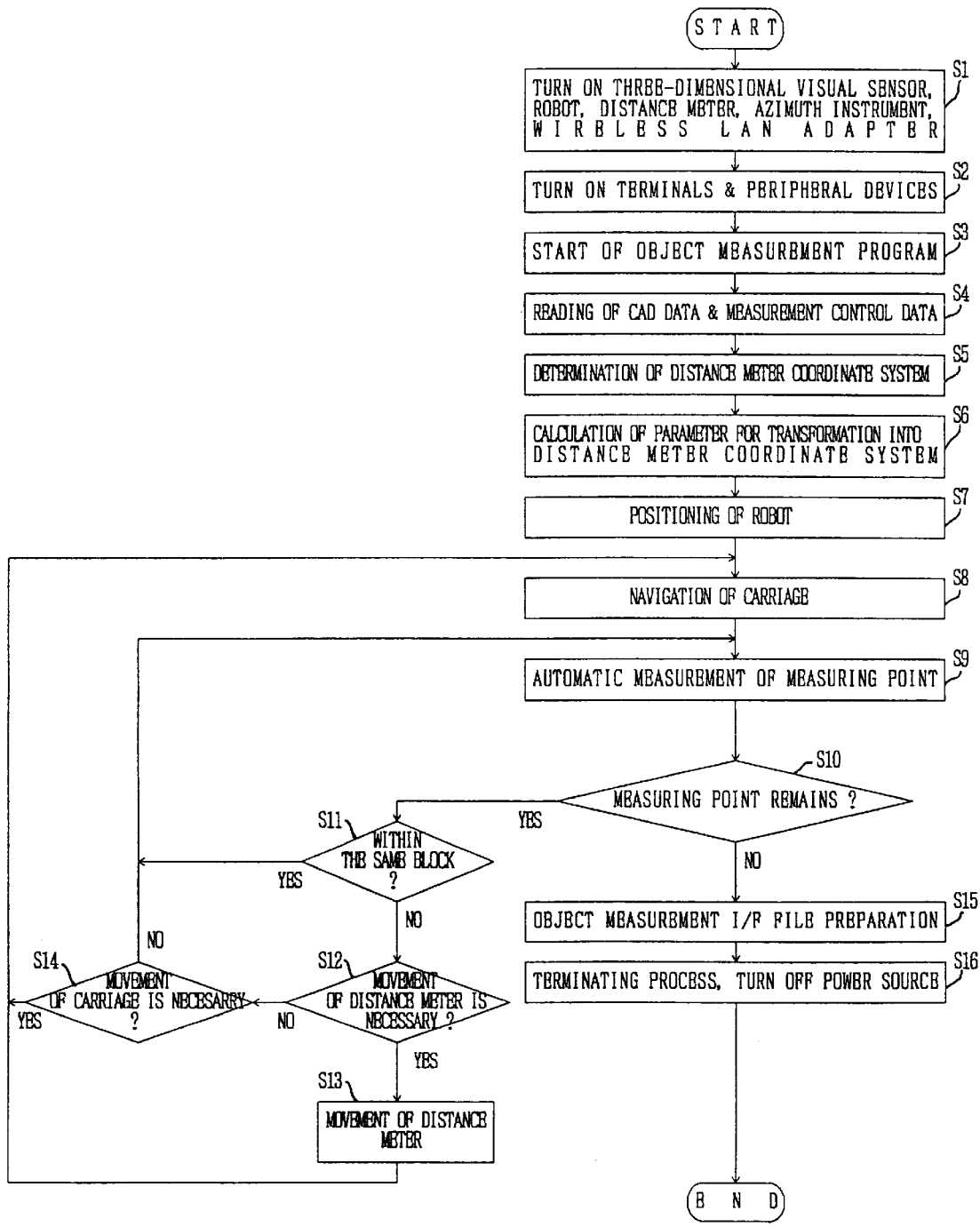
FIG. 4 is a flow chart of a measurement process performed by the structure measurement system of the embodiment.

Next, reference is made to the flow chart of FIG. 4 to explain the flow of the process performed by the structure measurement system according to this embodiment.

Figure 5:
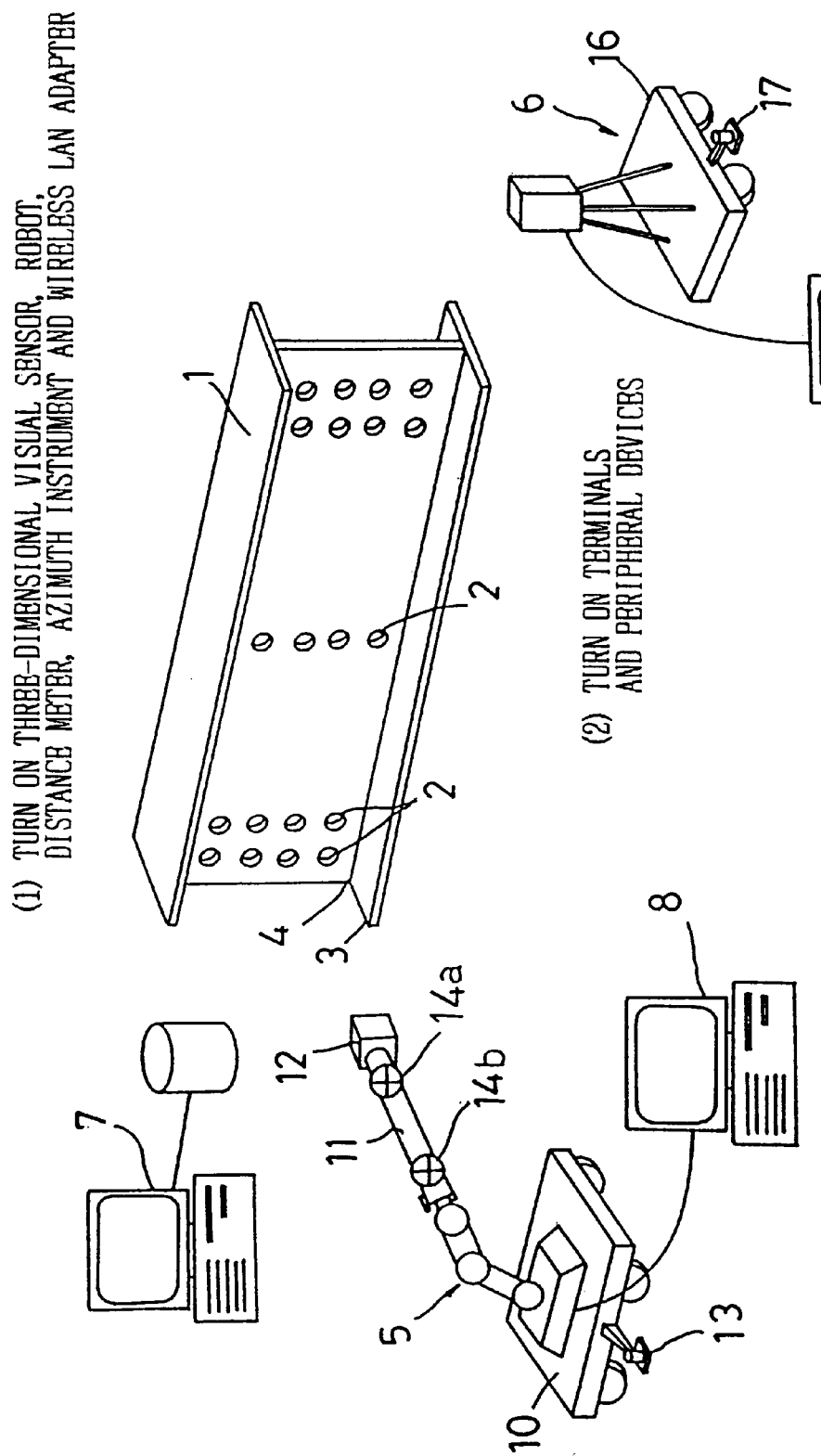
FIG. 5 is a diagram illustrating procedure (1) of a process performed by the structure measurement system.

S1 to S2: FIG. 5 illustrates a preliminary process in which the three-dimensional visual sensor 12, robot 5, distance meter 6, azimuth instrument 20, vibration sensor and wireless LAN adopter are turned ON and then the terminals 7, 8, 9 and peripheral devices are turned ON. Thereafter, the carriage 10 and the distance meter 6 are roughly placed on positions where the front face of the object 1 can be measured.

Figure 6:
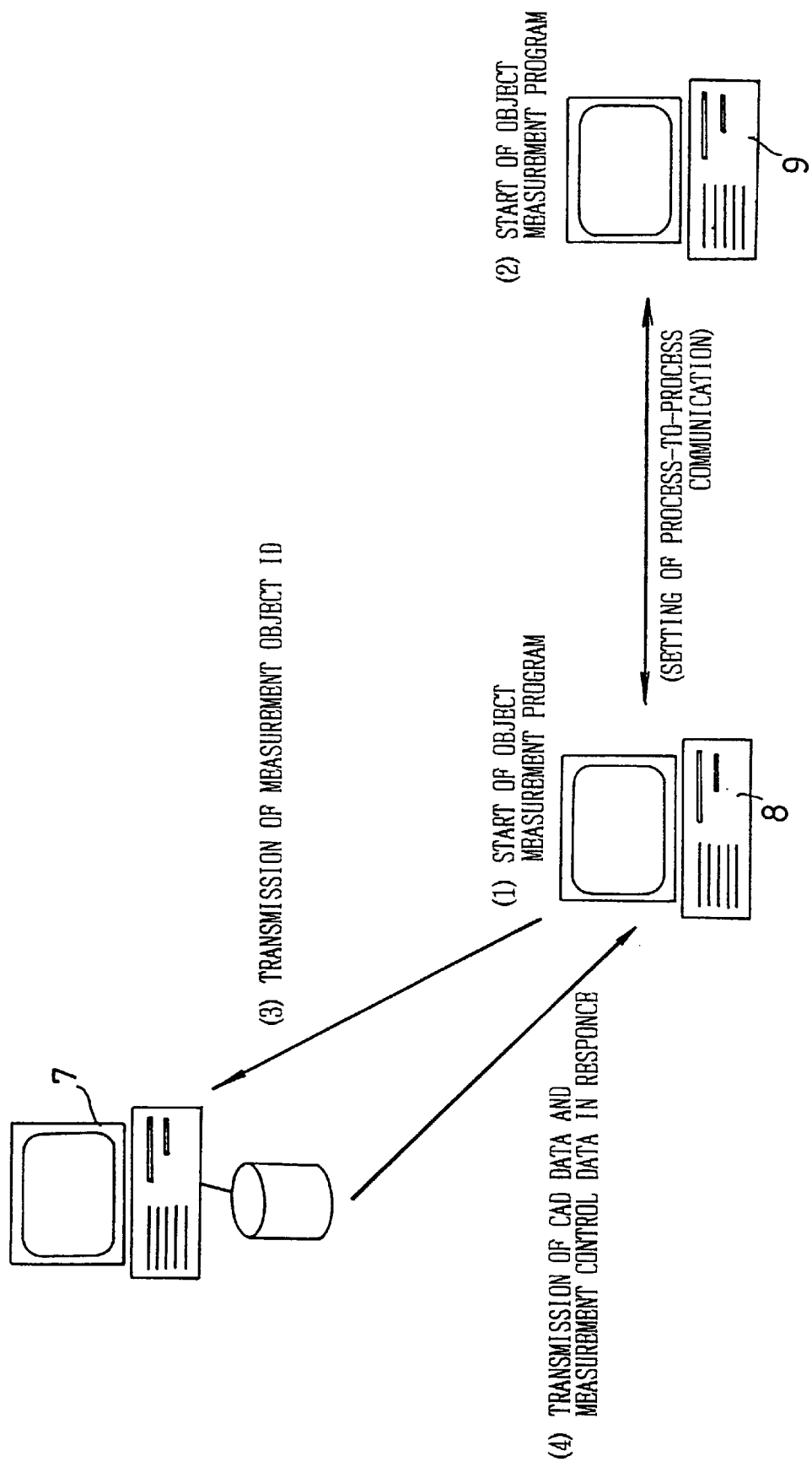
FIG. 6 is a diagram illustrating procedure (2) of the process performed by the structure measurement system.

S3 to S4: As shown in FIG. 6, the object measurement terminal 8 and the distance meter terminal 9 are activated to start an object measurement program while process-to-process communication between the terminals 8 and 9 is set. Then, the ID of an object to be measured is input in the object measurement terminal 8 and then transmitted to the data management terminal 7. In response, the data management terminal 7 prepares measurement control data according to the object's ID and transmits this measurement control data and prestored CAD data associated with the object 1 to the object measurement terminal 8. Note that the measurement control data provides, in connection with the object's ID, the position (x, y, z), orientation, type (hole or edge) and other information of each measuring point in the object.

Figure 7:
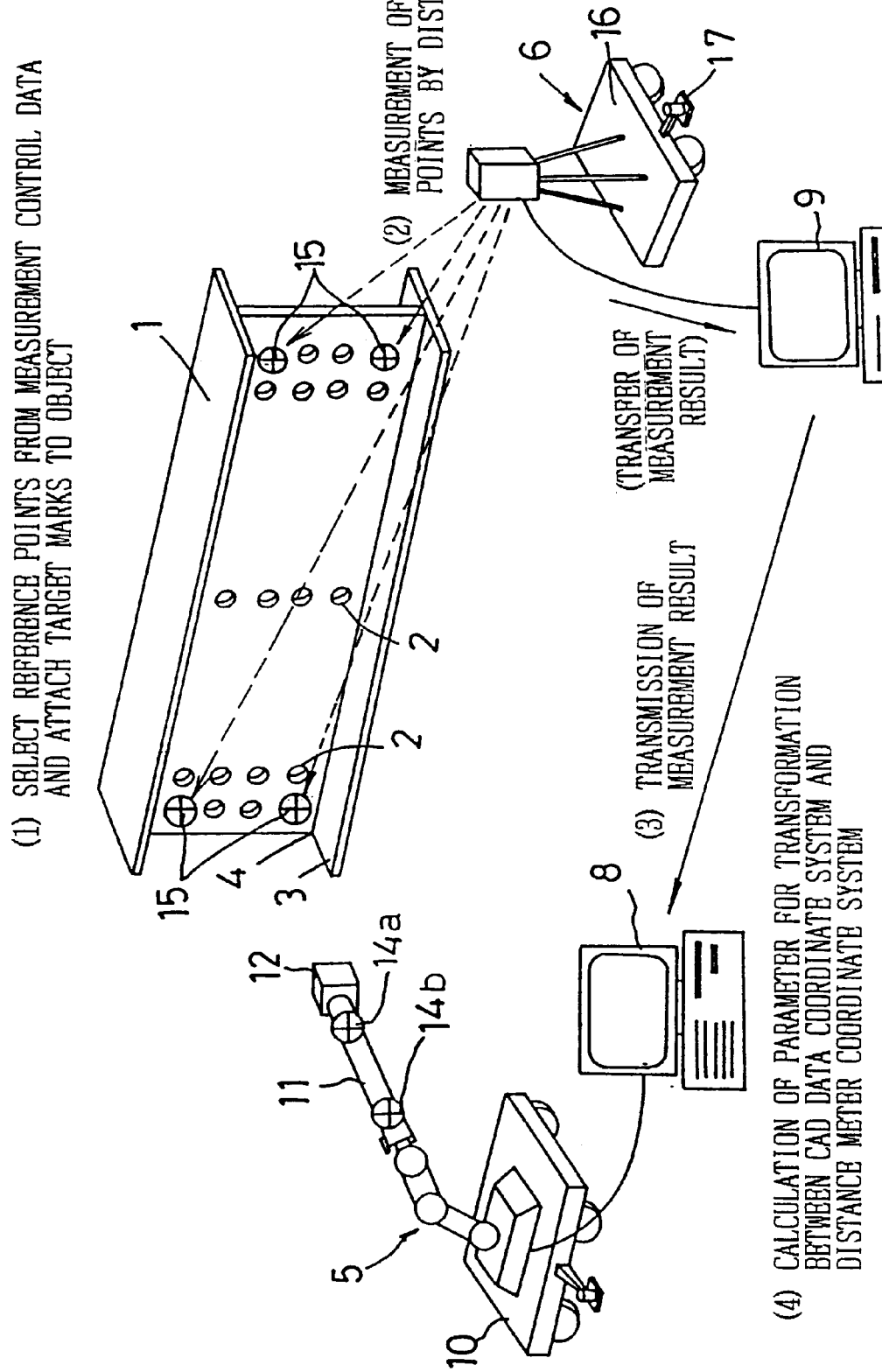
FIG. 7 is a diagram illustrating procedure (3) of the process performed by the structure measurement system.

S5 to S6: As shown in FIG. 7, several points (four points in this embodiment) are selected from the measurement control data as reference points and target marks 15 are affixed to these reference points on the object 1. In order to determine the position of the object 1 on the distance meter coordinate system, the target marks 15 are measured by the distance meter 6 and the result of the measurement is transmitted from the distance meter terminal 9 to the object measurement terminal 8. In response to a reference point measurement terminating command, the object measurement terminal 8 calculates a parameter for transformation between a CAD data coordinate system and the distance meter coordinate system. During measurement by the distance meter 6, the carriage 16 is anchored by the stabilizer 17, thereby preventing occurrence of measurement errors due to vibration.

Figure 8:
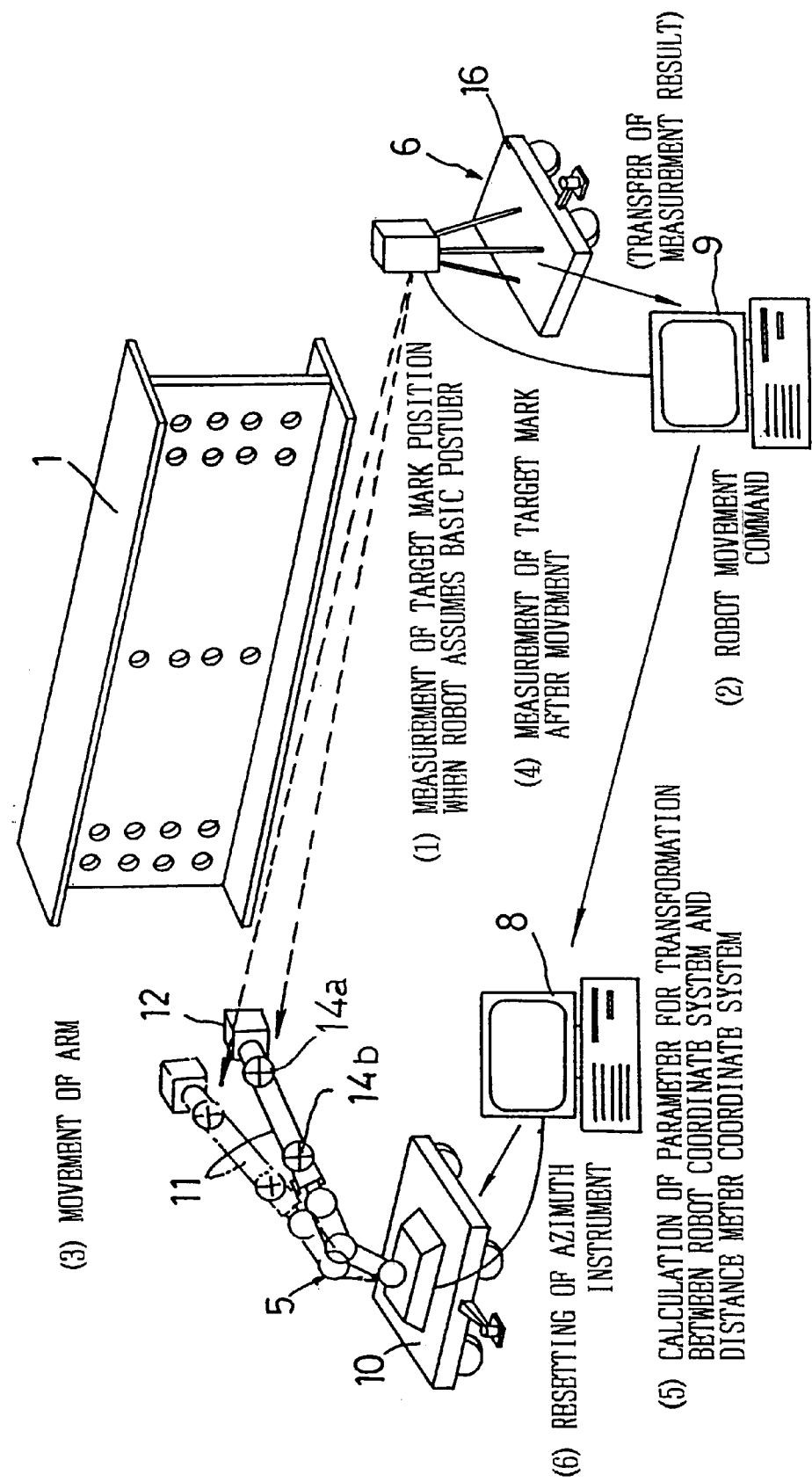
FIG. 8 is a diagram illustrating procedure (4) of the process performed by the structure measurement system.

S7: As shown in FIG. 8, the position of the target mark 14a when the robot 5 assumes a basic posture is measured by the distance meter 6 in order to position the robot 5. The position of the target mark 14a on a robot coordinate system is obtained. Then, the position of the target mark 14a on the robot coordinate system and that on the distance meter coordinate system are stored in the object measurement terminal 8. Thereafter, the distance meter terminal 9 issues a movement command for the arm 11 of the robot 5. After movement of the arm 11, the position of the target mark 14a is measured by the distance meter 6 and this position of the target mark 14a on the robot coordinate system and that on the distance meter coordinate system are stored in the object measurement terminal 8. The above process is repeated n times to obtain n number of coordinate values (i.e., coordinate values on the robot coordinate system and on the distance meter coordinate system) from which a parameter for transformation between the robot coordinate system and the distance meter coordinate system is obtained. After the calculation, the azimuth instrument 20 is reset.

Figure 9:
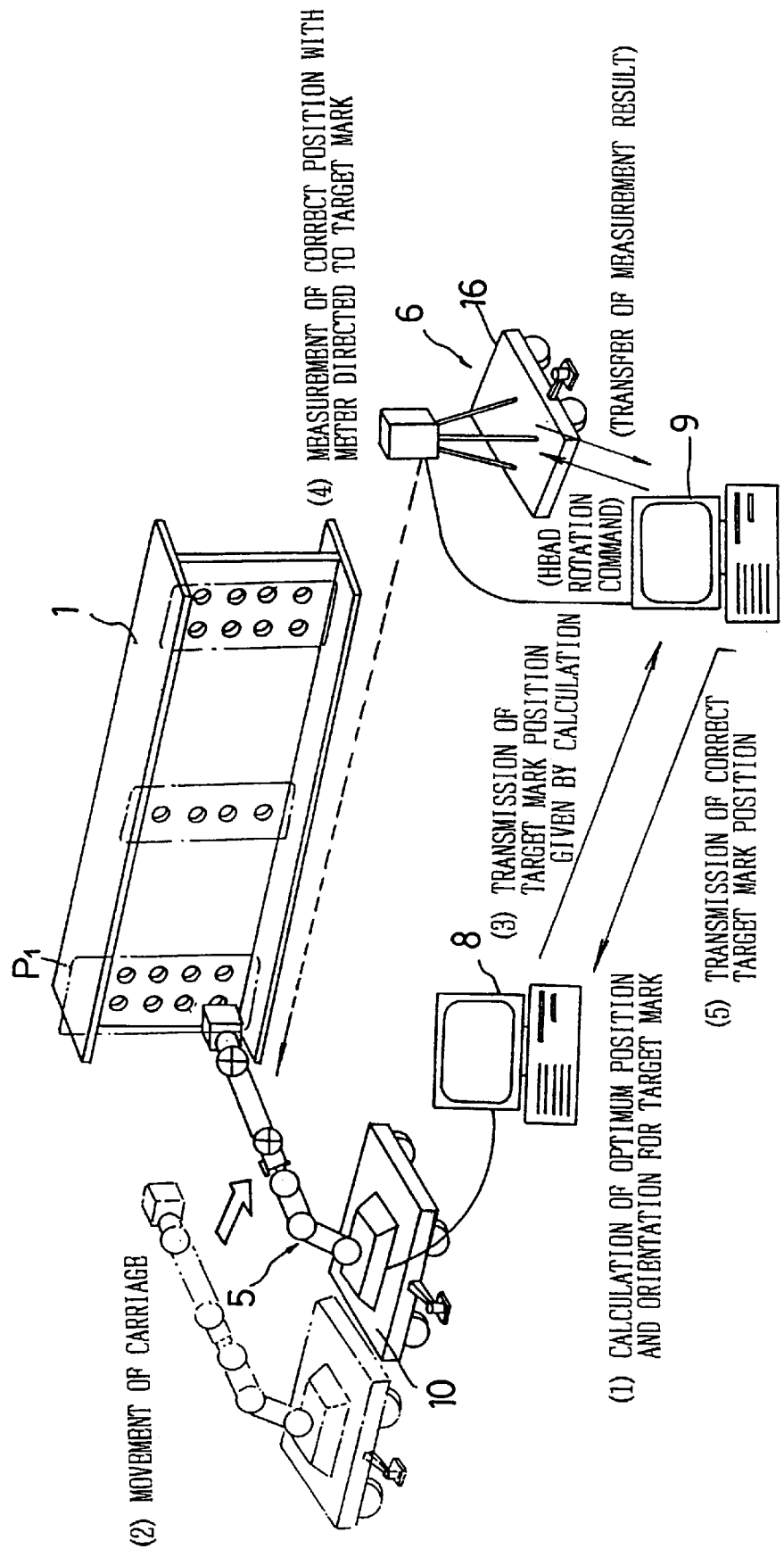
FIG. 9 is a diagram illustrating procedure (5) of the process performed by the structure measurement system.
Figure 10:
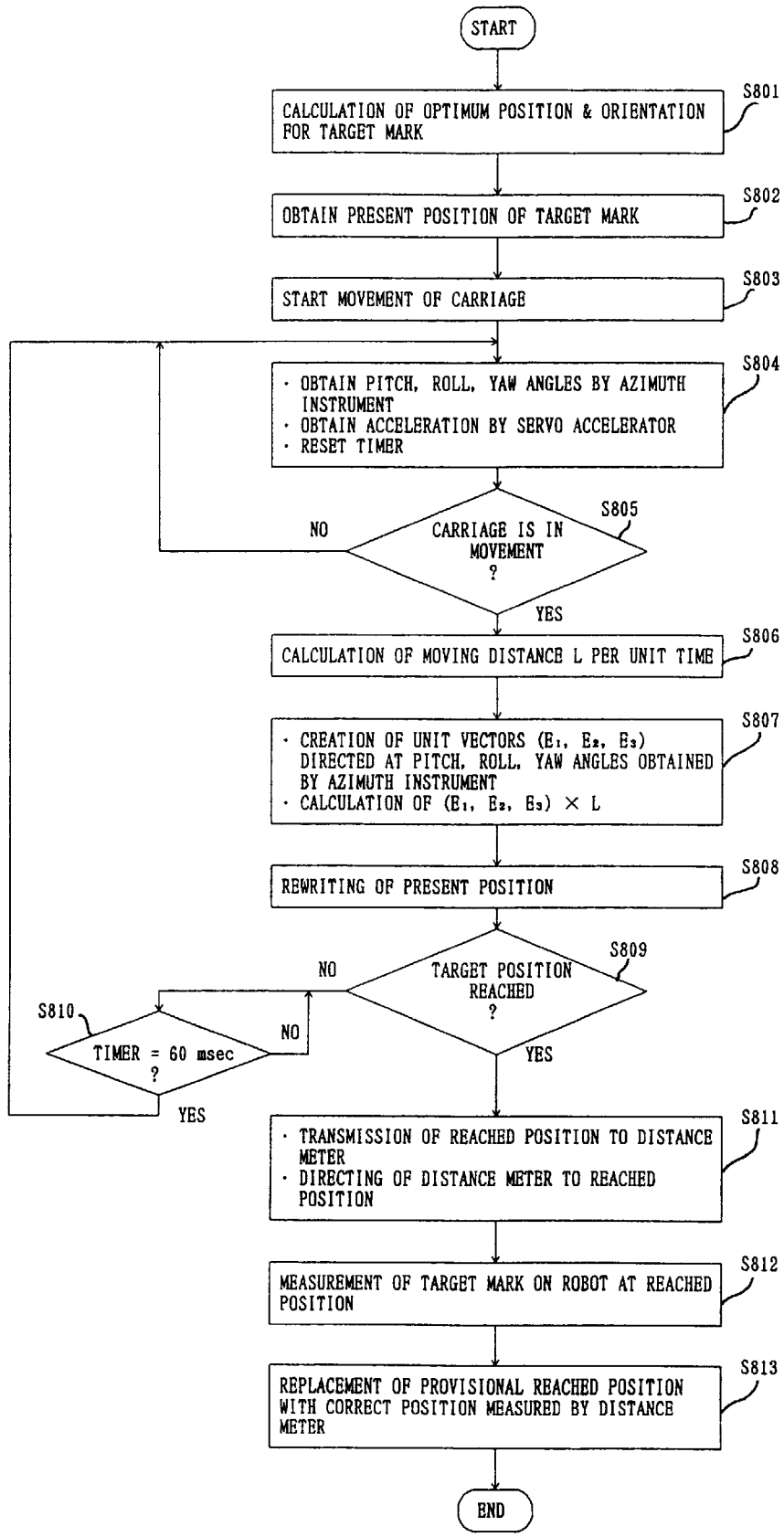
FIG. 10 is a flow chart of a navigation process for the carrier.

S8: As shown in FIG. 9, navigation of the carriage is carried out. This navigation is executed in the following procedure according to the flow chart of FIG. 10.

S801 to S803: The object measurement terminal 8 calculates the optimum position (target position $(T_1, T_2, T_3)$) and optimum orientation (target orientation: $(t_1, t_2, t_3)$) of the target mark 14a on the distance meter coordinate system, these optimum position and orientation being best for calculating all measuring points within a measurement block $P_1$ of the object 1. After data on the present position $(O_1, O_2, O_3)$ of the target mark 14a is obtained, the movement of the carriage 10 is started.

S804: Data on the pitch angle, roll angle, yaw angle of the carriage 10 is obtained by the azimuth instrument 20 while acceleration data is obtained by the servo accelerator 21 and the timer is reset.

S805 to S808: If the carriage 10 is not in movement, in other words, when the wheels of the carriage 10 are not in rotating motion, the step of S804 is executed again. On the other hand, if the carriage 10 is in movement, the moving distance L of the carriage 10 per unit time is calculated by the integration of acceleration while unit vectors $(E_1, E_2, E_3)$ corresponding to the pitch angle, roll angle and yaw angle obtained by the azimuth instrument 20 are created and the products of the respective vectors and the distance $(E_1, E_2, E_3) \times L$ are calculated. Thereafter, the present position $(O_1, O_2, O_3)$ is rewritten to $(O_1+E_1 \times L, O_2+E_2 \times L, O_3+E_3 \times L)$.

S809 to S811: If the carriage 10 has not reached the target position yet, the operation is placed in a stand-by state until elapsing time counted by the timer reaches a specified value (60 msec in this embodiment) and then the steps from S804 onward are executed again. If the carriage 10 has reached the target position, the position $(O_1, O_2, O_3)$ where the carriage 10 has reached is transmitted to the distance meter 6 to direct the distance meter 6 to the present position $(O_1, O_2, O_3)$. Whether or not the carriage 10 has reached the target position is determined by judging whether the following six conditions are met. Note that $\alpha$ and $\beta$ are minute values.

$$T_1 - \alpha \leq O_1 \leq T_1 + \alpha, t_1 - \beta \leq E_1 \leq t_1 + \beta,$$

$$T_2 - \alpha \leq O_2 \leq T_2 + \alpha, t_2 - \beta \leq E_2 \leq t_2 + \beta,$$

$$T_3 - \alpha \leq O_3 \leq T_3 + \alpha, t_3 - \beta \leq E_3 \leq t_3 + \beta,$$

During the navigation movement, the position of the carriage 10 and a destination for it are displayed on the screen of the object measurement terminal 8.

S812 to S813: When the carriage 10 has reached the target position, the target mark 14a on the robot 5 is measured by the distance meter 6 to obtain the position $(O_1', O_2', O_3')$ of the target mark 14a. Then, the provisional target position $(O_1, O_2, O_3)$ where the carriage 10 has reached after navigation movement is replaced by the correct position $(O_1', O_2', O_3')$ obtained by the distance meter 6.

Figure 11:
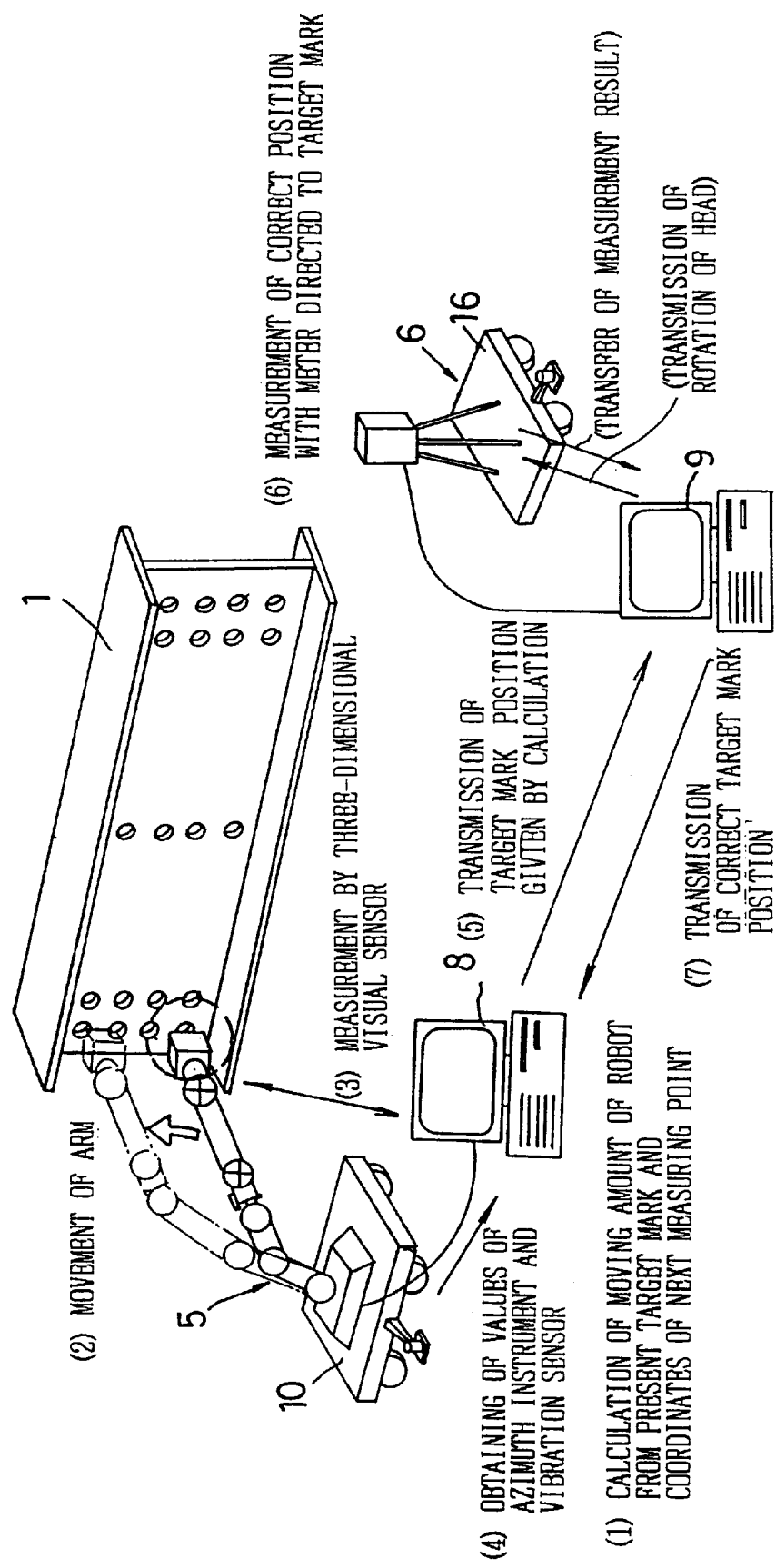
FIG. 11 is a diagram illustrating procedure (6) of the process performed by the structure measurement system.
Figure 12:
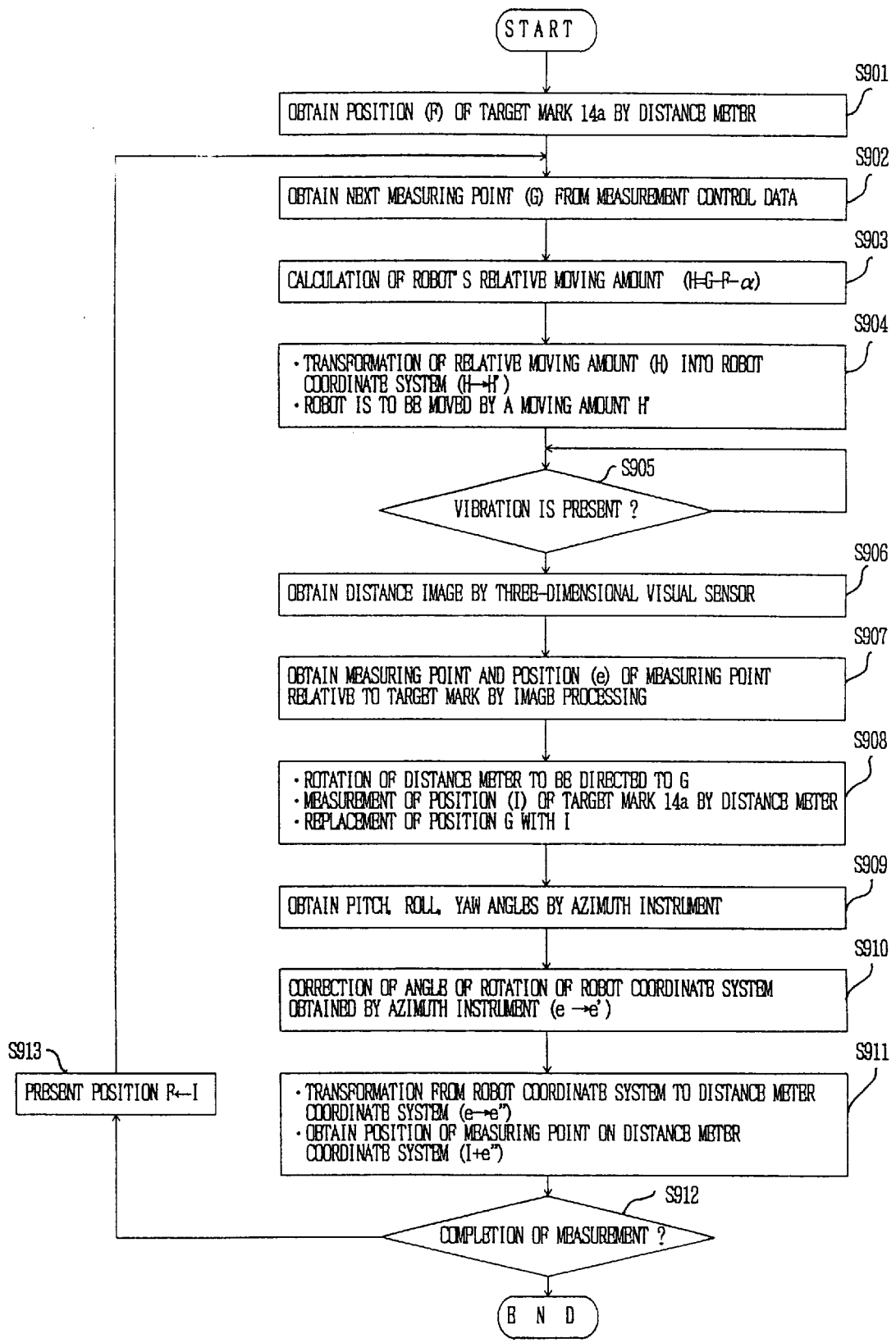
FIG. 12 is a flow chart of an automatic measurement process performed on a measuring point.

S9: As shown in FIG. 11, automatic measurement of a measuring point is carried out. This automatic measurement is performed in the following procedure according to the flow chart shown in FIG. 12.

S901 to S904: After anchoring the robot 5 by the stabilizer 13, the start button is depressed to start measurement and data F associated with the position of the target mark 14a on the arm 11 is obtained by the distance meter 6. Then, data G associated with the next measuring position is obtained from the measurement control data and a relative moving amount H of the robot 5 is calculated from the data F and G (H=G−F−α). Note that the value α is determined such that the measuring instrument is located immediately before the object. Thereafter, the relative moving amount H is converted into coordinates on the robot coordinate system to obtain a moving amount H' by which the arm 11 of the robot 5 is to be moved.

S905 to S907: The vibration of the three-dimensional visual sensor 12 is checked by the vibration sensor. If vibration is detected, the operation waits until the vibration ceases. If no vibration is detected, the distance image of the measuring point is obtained by the three-dimensional visual sensor. Then, this distance image is processed to obtain the position of the measuring point and the relative position e of the measuring point in relation to the target marks 14a. Note that when the measuring point is the bolt hole 2, the position of the measuring point is indicative of the center position of the bolt hole 2.

S908: The distance meter 6 is rotated to be directed to the next measuring point G and the position I of the target mark 14a is measured by the distance meter 6 to replace the point G with the position I.

S909 to S911: The pitch angle, roll angle, yaw angle of the carriage 10 are obtained by the azimuth instrument 20. The angle of rotation of the robot coordinate system obtained by the azimuth meter 20 is corrected to obtain a correction value e' for the position e, the correction value e' being relative to the target mark 14a that serves as a reference point. The correction value e' is then transformed from the robot coordinate system to the distance meter coordinate system to obtain a value e" from which the position I+e" of the measuring point on the distance meter coordinate system is obtained.

S912 to S913: If measurement has not been completed, the position I is set as the present position F and the steps S902 onward are repeated. If measurement has been completed, the program is ended.

Figure 13:
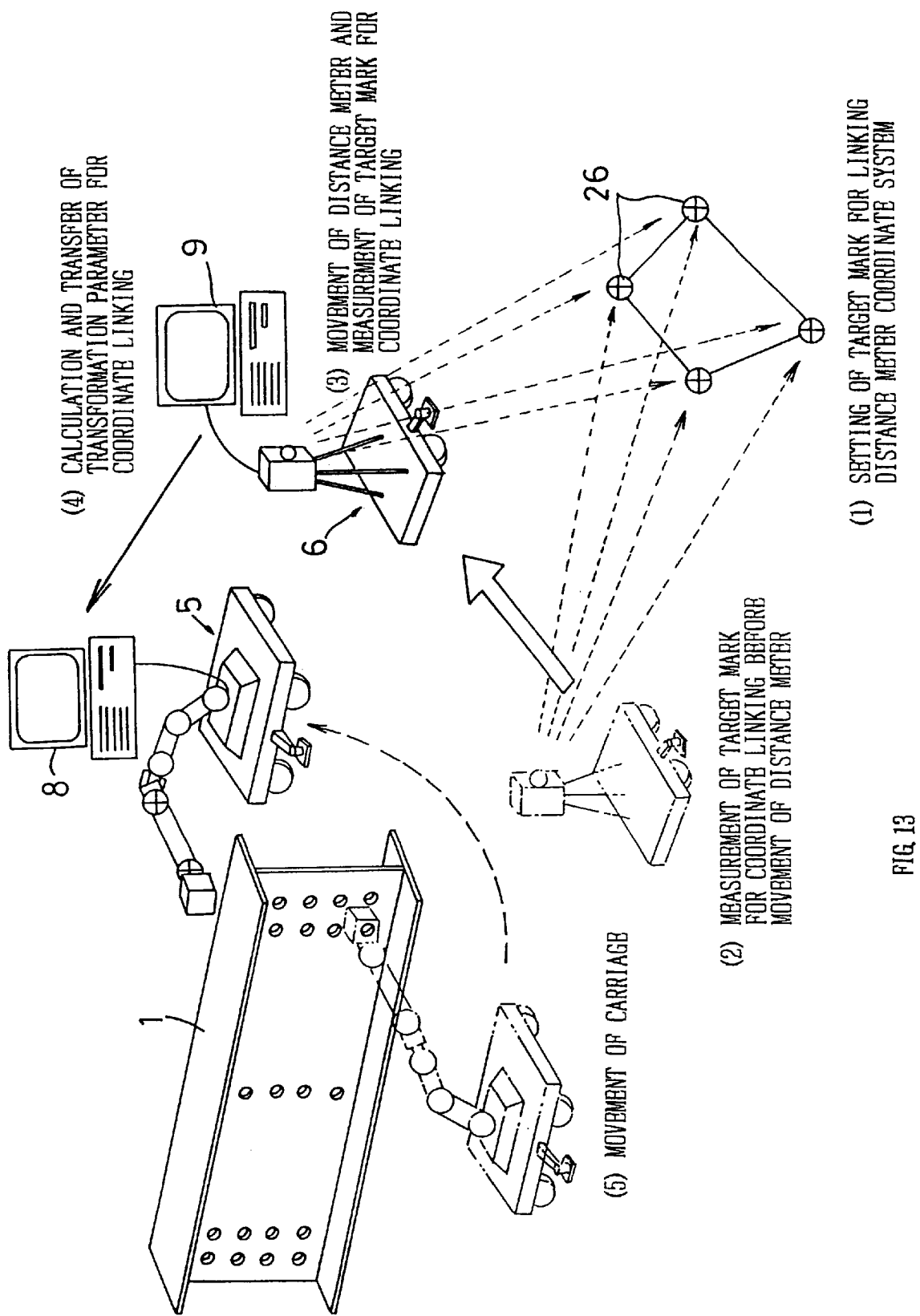
FIG. 13 is a diagram illustrating procedure (7) of the process performed by the structure measurement system.

S10 to S14: If there still remains a measuring point after the automatic measurement is accordingly done and this measuring point is within the same block, the automatic measurement in Step S9 is carried out in the same way. If the remaining measuring point is not within the same block, a check is then made to determine if movement of the distance meter 6 is necessary. If necessary, the distance meter 6 is moved and the program is returned to Step S8. If the movement of the distance meter 6 at that time is toward the rear side of the object 1 for example, a target mark 26 used for linking with the distance meter coordinate system is set as shown in FIG. 13 and this target mark 26 for coordinate system linking is measured prior to the movement of the distance meter 6. Then, the distance meter 6 is moved to a position where it can measure the rear side of the object 1. At this position, the target mark 26 for coordinate system linking is again measured. After that, if movement of the carriage 10 is necessary, the carriage 10 is then moved to the rear side of the object 1 and a transformation parameter for coordinate system linking is calculated in the distance meter terminal 9 and the result of the calculation is transmitted to the object measurement terminal 8. If movement of the carriage 10 is unnecessary, the program returns to Step S9 to execute the automatic measurement process.

Figure 14:
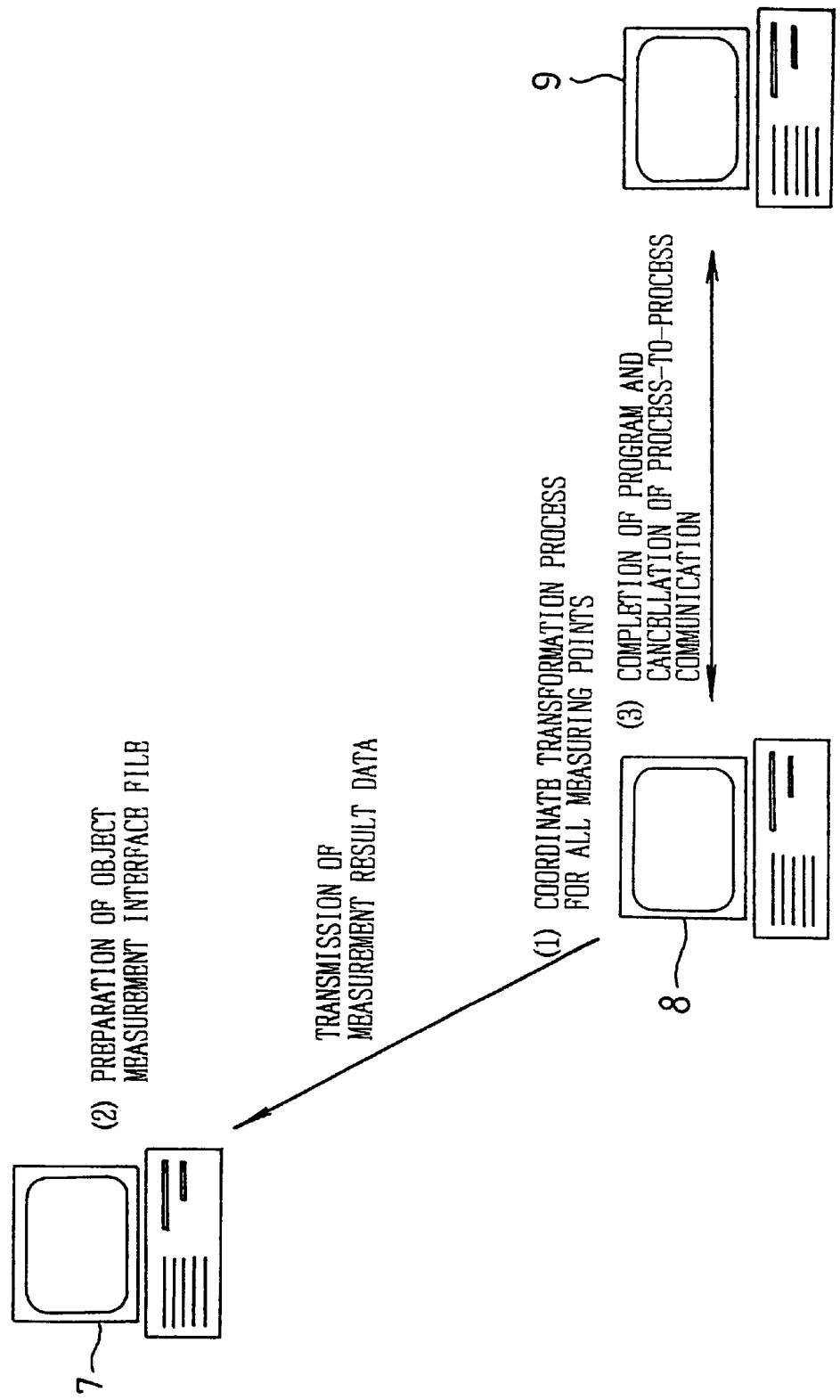
FIG. 14 is a diagram illustrating procedure (8) of the process performed by the structure measurement system.
Figure 15:
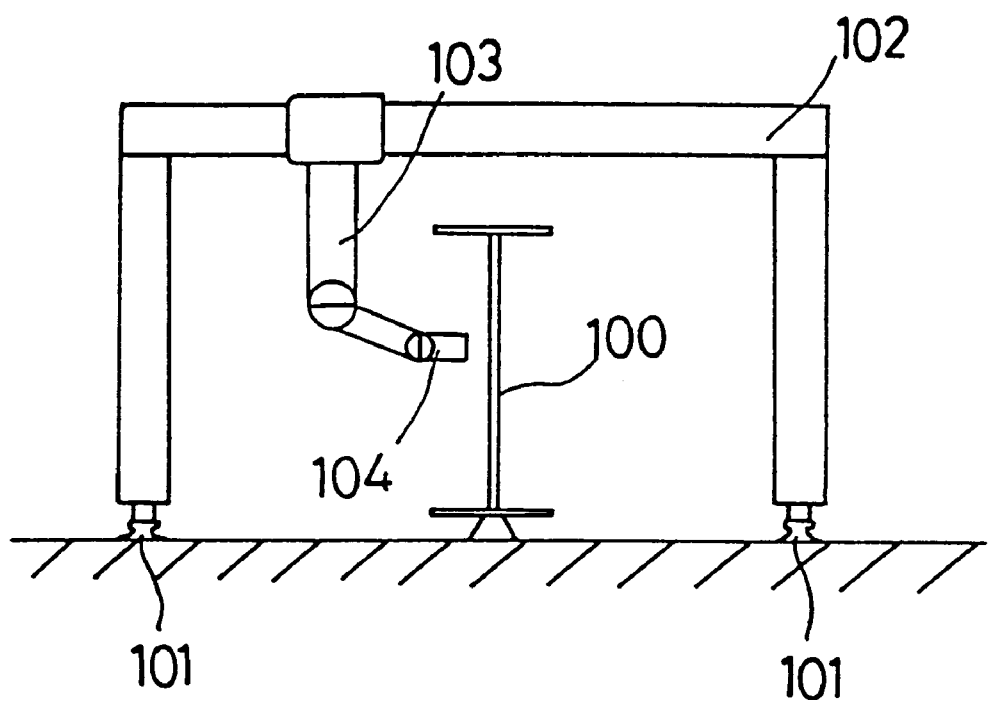
FIG. 15 illustrates one example of a conventional structure measurement system.

S15 to S16: If measurement of all the measuring points has been completed, post-processing is executed as shown in FIG. 14, in which coordinate transformation for all the measuring points is performed by the object measurement terminal 8 and data on the result of the measurement is transmitted to the data management terminal 7 where an object measurement interface file is prepared. For termination process, process-to-process communication between the object measurement terminal 8 and the distance meter terminal 9 is canceled and the power source is turned off.

According to this embodiment, as the robot 5 is designed to be movable to desired positions in desired directions, large-sized fixed equipment and large installation space are no longer necessary, which leads to cost reduction in the overall system. By virtue of the automatic search for measuring points by image processing, there is no need to affix target marks etc. to all the measuring points and to collimate the angle measuring instrument relative to the measuring points which causes lots of fatigue to the workman. Additionally, the position and orientation of a measuring point can be determined through automatic arithmetic operation utilizing prestored CAD data so that labor can be saved. Further, use of the non-contacting type three-dimensional visual sensor 12 in measuring a measuring point does not cause unfavorable troubles such as wear of the measuring instrument, so that long service life can be ensured. In addition, measurement can be carried out while monitoring a stereoscopic vision located in front of the measuring instrument to avoid interference, which contributes to increased reliability.

While the system according to this embodiment includes three individual terminal units for data processing, that is, the data management terminal 7, the object measurement terminal 8 and the distance meter terminal 9, the object measurement terminal 8 may be integrally formed with the distance meter terminal 9. It is also possible to integrally form these terminals 7, 8, 9 as one control operation computer to control the overall system.

While the robot 5 of this embodiment is of an articulated type, a rectangular coordinate type robot may be employed.

In this embodiment, the target marks 15 are affixed to the surface of the object 1 as reference points for the object 1. Alternative arrangement is such that bolt holes in the object 1 that serve as reference points are determined beforehand and reference point measurement is made by measuring these reference bolt holes.

In this embodiment, an automatic navigation function is provided for the carriage 10 such that the carriage 10 moves by itself and recognizes its own present position. Alternatively, the carriage may be driven by the workman.

We claim:

1. A structure measurement system comprising:
   (a) a robot that comprises an arm carrying a measuring instrument for measuring a structure as a measuring object and that is movable in desired directions;
   (b) a distance measuring unit for measuring a position of the arm and an installation position of the structure; and
   (c) a measuring point calculating operation unit for prestoring design data associated with a configuration of the structure and calculating a position of a measuring point in the structure measured by the measuring instrument, based on the design data and positional data obtained by the distance measuring unit, the position of the measuring point in the structure being represented by a coordinate system of the distance measuring unit.

2. A structure measurement system according to claim 1, wherein said measuring instrument is a three-dimensional visual sensor of a non-contacting type for measuring the position and orientation of a measuring point in the measuring object, by picking up a three-dimensional image of the measuring object and processing the image.

3. A structure measurement system according to claim 1, wherein said robot comprises an azimuth instrument and an accelerometer as well as a robot position calculating operation unit that calculates the position of the robot based on orientation data and speed data obtained by the azimuth instrument and the accelerometer respectively.

4. A structure measurement system according to any one of claims 1 to 3, wherein said distance measuring unit measures the installation position of the structure by measuring at least three target marks attached to the structure at specified positions.

5. A structure measurement system according to any one of claims 1 to 3, wherein said distance measuring unit measures the position of the arm by measuring a target mark attached to the arm at a specified position.

* * * * *